Dec. 16, 1930.   E. I. SPONABLE   1,785,215
FILM PUNCH
Filed March 26, 1928
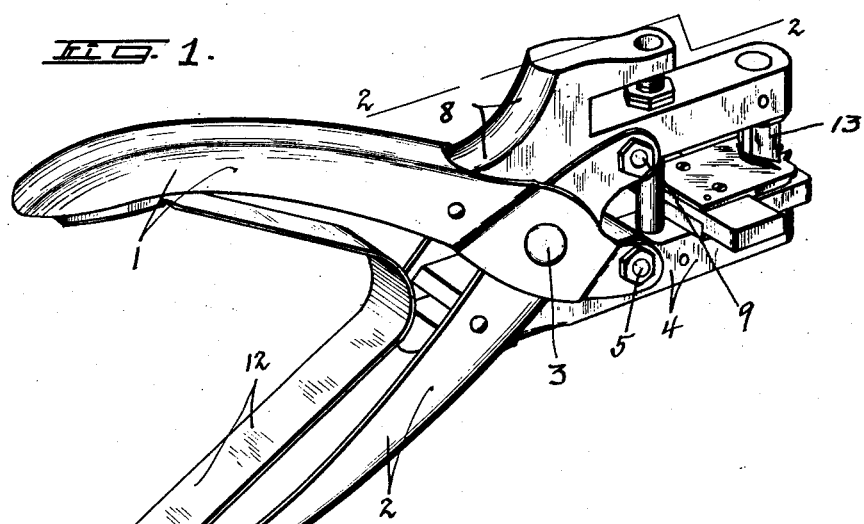
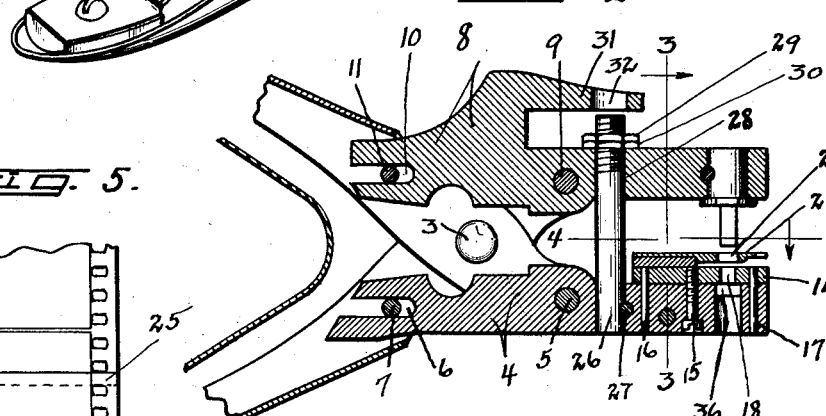
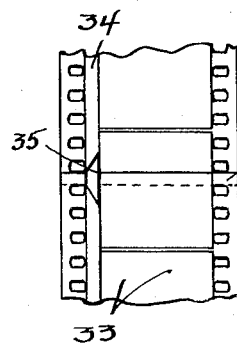
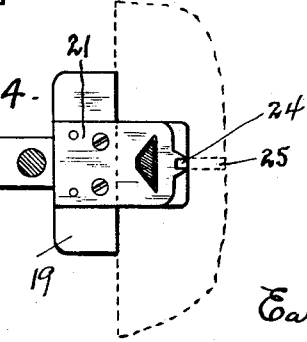
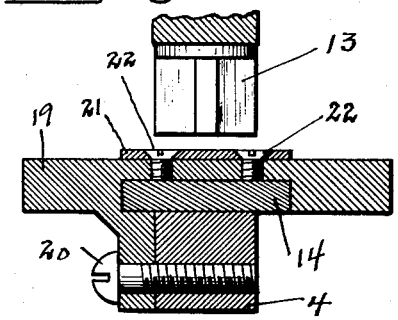
Earl I. Sponable INVENTOR
BY Denison & Thompson ATTORNEYS.
WITNESS
H. W. Hurst.

Patented Dec. 16, 1930

1,785,215

UNITED STATES PATENT OFFICE

EARL IRA SPONABLE, OF NEW YORK, N. Y., ASSIGNOR TO FOX CASE CORPORATION, OF NEW YORK, N. Y., A CORPORATION OF NEW YORK

FILM PUNCH

Application filed March 26, 1928. Serial No. 264,705.

This invention relates to a new and improved device for puncturing negative films from which are to be made positive films for use in moving picture apparatus and has particular reference to that part of the negative on which a sound record has been registered.

In order to prepare a film for projection it is necessary that the film be spliced at various points along its length. In the case of films which are used merely to project pictures these splices have no effect upon the visibility of the picture being projected. Where, however, a sound record has been made along one edge of a film so that the sounds accompanying the picture being taken may be reproduced simultaneously with the reproduction of the picture, it has been found that these splices are the cause of a click or interruption in the sound as they pass the sound reproducing apparatus. It has also been found that these clicks or interruptions may be avoided if the film or positive, at and adjacent the place where it has been spliced, is rendered opaque, such opaque portion tapering or being gradually reduced in area on each side of the splice until the film again assumes the normal condition of the sound record.

It has also been found that the best and most convenient means by which these portions at and adjacent the splice may be rendered opaque consists in producing at the splice a properly shaped perforation through the negative film from which the positive film, which is the one generally used in projecting, is to be made. This is due to the fact that any perforation in a negative film will result in a similarly shaped opaqued region or area on the positive film which is made from it.

In making these perforations in a negative film it is essential that the perforation be very exactly placed in the film and of a regular size, and the main object of my invention is to produce a device by which these perforations may be easily and quickly made and with the assurance that they will be positioned in exactly the proper places in the film.

Other objects and advantages relate to the size, shape and arrangement of parts all as will more fully appear from the following description taken in connection with the accompanying drawings in which:—

Figure 1 is a perspective view of my device showing the jaws in the open position.

Figure 2 is a section on line 2—2 of Figure 1.

Figure 3 is a section on line 3—3 of Figure 2.

Figure 4 is a section on line 4—4 of Figure 2 showing in dotted lines a portion of a negative film in position in the device.

Figure 5 is a top view partially broken away of a negative film showing a perforation in the sound record.

It will be understood that my device may be used in conjunction with different types of apparatus which are capable of causing my punch and die to register one with the other but for the purpose of describing the functioning of a suitable device, I have shown an apparatus which consists of an upper hollow operating lever —1— fulcrumed to a lower operating lever —2— by means of a pivot pin —3—. A lower jaw —4— is pivotally mounted in the forward end of lever —1— by means of a pivot pin —5— and is provided at its rear end with a slot —6— slidably mounted on a rod —7— carried by the lower lever —2—. A second jaw —8— is in a similar manner pivoted to the forward end of lower lever —2— by means of pivot pin —9— and carries in its rear end a slot —10— slidably mounted on a rod —11— carried by upper lever —1—.

The shape of levers 1 and 2 and the position of pivot pins 5 and 9 with relation to bars 7 and 11 is such that when the levers 1 and 2 are moved with relation to each other the jaws 4 and 8 will be moved to and from each other but will at all times remain in parallel relation.

I also provide a spring —12— between the handles of levers 1 and 2. The spring 12 is of a shape and tension to yieldingly hold the rear ends of levers 1 and 2 apart so that normally the jaws 4 and 8 will be held in the open position.

The forward end of upper jaw 8 is provided with a depending punch 13, in this case shown as of the shape of a truncated wedge with the truncated end facing rearwardly on the upper surface of lower jaw —4—. I provide a die —14— secured in place by a screw —15— and pins —16— and —17— extending rearwardly from the front end of jaw —4— and positioned so that punch —13— will register with the hole —18— in the die —14— when the jaws 4 and 8 are moved toward each other. On the upper surface of die —14— I provide a back plate —19— secured in position on jaw —4— by means of screw —20—. Back plate —19— extends transversely of jaw —4— and outwardly from both sides thereof for a purpose hereinafter to be described. A guide plate —21— is secured to the upper surface of back plate —19— by means of screws 22—22. Guide plate —21— extends forwardly over die —14— in spaced relation thereto and is provided with a hole —23— to permit the passage therethrough of punch —13—. The forward end of guide plate —21— is provided with an indexing slot —24— of substantially the same width as the usual splice —25— on a film.

A vertical post —26— extends upwardly from lower jaw —4— and is secured therein by means of pin —27—. Post —26— extends upwardly through an aperture —28— in upper jaw —8— and is provided with an upper threaded end for the reception of nuts —29— and —30—. Upper jaw —8— carries a forwardly extending tongue —31— which carries an aperture —32— positioned to receive the upper end of post —26— when jaws —4— and —8— are moved toward each other. Aperture —32— will not permit the passage through it of nuts —29— and —30— so that when jaws 4 and 8 approach each other this movement will be limited by the engagement of nut —29— with the under surface of tongue —31—. Nuts —29— and —30— being vertically movable on post —26— the limit of movement of jaws 4 and 8 toward each other may be varied as desired.

The distance between guide plate —21— and die —14— is sufficiently great to permit the insertion therebetween of a film —33—, and the distance between hole —18— in die —14— and back plate —19— is such that when a film —33— is inserted between guide plate —21— and die —14— and is held against the front face of back plate —19—, the hole —18— in die —14— will be positioned so that punch —13— will exactly register on that part of film —33— which carries the sound record shown as —34— on Figure 5. In operation a film —33— is inserted between guide plate —21— and die —14— with slot —24— in guide plate —21— registered directly above splice —25— in film —33— and with the edge of film —33— positioned against back plate —19—. Jaws 4 and 8 are then moved towards each other which results in the downward movement of punch —13— against and through the portion —34— of film —33— which carries the sound record, the cutaway portion of film —33— passing outwardly through a slot —36— in jaw —4—. As perhaps may best be seen in Figure 5, the hole —35— thus made in film —33— will remove from film —33— the entire portion of the sound record —34— which carries the splice —25— and preferably similar symmetrical portions of sound record —34— on opposite side of splice —25— will also be removed, such latter portions gradually diminishing in area as they extend away from splice —25—.

It will be understood that the purpose of my device is to remove a portion of sound record —34— so that when a positive film, not shown, is made from a negative film —33— a section of the sound record portion of the positive film will be opaque. The portion of the sound record at the point of the splice in the positive film will be entirely opaque and such opaqueness will continue from each side of the splice over a gradually decreasing area until sound record portion again assumes the normal condition of the sound record. In order to accomplish this result I have here shown a punch —13— of the shape of a truncated wedge but it will be understood that punches of different shapes may be used, as for example, a punch of the shape of a segment of a circle, the only requirement being that the punch be so shaped that there will be removed from the sound record —34— all of the film in the splice —25— and that other portions of the sound record —34— on opposite sides of splice —25— will also be removed in gradually diminishing areas. It will also be understood that my punch —13—, die —14—, back plate —19— and guide plate —21— may be used in conjunction with any device which is capable of causing punch —13— to register in die —14—.

Although I have shown and described a particular arrangement and form of part as an exemplification of an embodiment of my invention I do not desire to restrict myself to the exact shape, form or arrangement of parts as various changes may be made within the scope of the appended claims.

I claim:

1. In a punch for removing spliced portions of a sound record element of a sound moving picture film, a punch, a die, a back plate for positioning the punch transversely of the film, a guide plate, and means for positioning the punch longitudinally of the film, said means comprising opposed fingers extending outwardly from the guide plate and spaced apart a distance corresponding to the width of the splice.

2. In a punch for removing spliced portions of a sound record element, of a sound moving picture film and tapered portions of the sound record on either side of the splice, a punch, a die, a back plate for positioning the punch transversely of the film, a guide plate spaced above the die, two parallel fingers extending outward from said guide plate and spaced apart a distance corresponding to the width of the splice for accurately positioning the punch longitudinally of the film.

3. In a punch for removing spliced portions of a sound record element, of a sound moving picture film and tapered portions of the sound record on either side of the splice, a punch, a die, a back plate for positioning the punch transversely of the film, a guide plate spaced above the die, two parallel fingers extending outward from said guide plate and spaced symmetrically with respect to the transverse center line of the die and apart a distance corresponding to the width of the splice for accurately positioning the punch longitudinally of the film.

In witness whereof I have hereunto set my hand this 19th day of March, 1928.

EARL I. SPONABLE.